United States Patent
Ito et al.

(10) Patent No.: US 6,391,084 B1
(45) Date of Patent: May 21, 2002

(54) METAL NICKEL POWDER

(75) Inventors: Takayuki Ito; Hideo Takatori, both of Kanagawa (JP)

(73) Assignee: Toho Titanium Co., Ltd., Chigasaki (JP)

(*) Notice: Subject to any disclaimer, the term of this patent is extended or adjusted under 35 U.S.C. 154(b) by 0 days.

(21) Appl. No.: 09/508,820

(22) PCT Filed: Jul. 21, 1998

(86) PCT No.: PCT/JP99/03888

§ 371 Date: Mar. 29, 2000

§ 102(e) Date: Mar. 29, 2000

(87) PCT Pub. No.: WO00/06326

PCT Pub. Date: Feb. 10, 2000

(30) Foreign Application Priority Data

Jul. 27, 1998 (JP) .............................................. 10-210754

(51) Int. Cl.[7] .............................. B22F 1/02; H01G 4/008
(52) U.S. Cl. ................................ 75/255; 75/367; 75/629
(58) Field of Search ........................... 75/255, 367, 629

(56) References Cited

FOREIGN PATENT DOCUMENTS

| JP | 62-33089 A2 | * | 2/1987 | | |
|----|-------------|---|--------|---|---|
| JP | 4-45207 | | 2/1992 | | |
| JP | 4-365806 | | 12/1992 | | |
| JP | 06-025704 A | * | 2/1994 | ............. | B22F/1/02 |
| JP | 8-157904 | | 6/1996 | | |
| JP | 8-246001 | | 9/1996 | | |
| JP | 10-219313 | | 8/1998 | | |
| JP | 10-324906 | | 12/1998 | | |
| JP | 11-80817 | | 3/1999 | | |
| JP | 11-124602 | | 5/1999 | | |
| JP | 11-140514 | | 5/1999 | | |

* cited by examiner

Primary Examiner—Roy King
Assistant Examiner—Harry D. Wilkins, III
(74) Attorney, Agent, or Firm—Oliff & Berridge, PLC

(57) ABSTRACT

The present invention provide metallic nickel powder in which the occurrence of delaminatoin can be prevented by providing superior sintering propreties in production processes for multilayer ceramic capacitors and by providind superior dispersion characteristics in the forming of conductive pastes. By being brought into contact with nickel chloride gas and a reducing gas at a temperature in the range of the reduction reaction, metallic nickel power is node gas and a reducing gas at a produced in which the oxigen content is 0.1 to 2.0% by weight and there is not absortion peak at wavelengths ranging from 3600 to 3700 $cm^{-1}$ in infrared spectroscopy.

10 Claims, 2 Drawing Sheets

(a)

(b)

METAL NICKEL POWDER

TECHNICAL FIELD

The present invention relates to a metallic nickel powder suitable for conductive pastes, and in particular, relates to a metallic nickel powder having superior sintering properties and dispersion characteristics, which is specifically suitable for conductive pastes for, and internal electrodes for, multilayer ceramic capacitors.

BACKGROUND ART

Noble metals such as silver, palladium, platinum, and gold, and base metals such as nickel, cobalt, iron, molybdenum, and tungsten have been used for electrical parts such as conductive pastes, and have long been specifically used in internal electrodes for multilayer ceramic capacitors. Multilayer ceramic capacitors have a construction such that ceramic dielectric layers and metallic layers used for internal electrodes are alternately laminated, and external electrodes, which are connected to the metallic layers, are connected to both ends of the ceramic dielectric layers. Materials having high dielectric constants, such as barium titanate, strontium titanate, and yttrium oxide, are used as primary components for forming the ceramic dielectric layers. Powders of the above noble metals and the base metals are used in the metallic layers for forming the internal electrodes. Recently, less expensive electrical parts are recently required, and therefore research on multilayer ceramic capacitors using the latter base metallic powders has been aggressively pursued, and nickel powder is typical among these metals.

Multilayer ceramic capacitors are generally manufactured by the following method. That is, a dielectric powder, such as barium titanate, is mixed and suspended in an organic binder, and this is then formed into a sheet by using a doctor blade method so as to produce a dielectric green sheet. On the other hand, a metallic powder for internal electrodes is mixed with an organic compound such as an organic solvent, a plasticizer, or an organic binder so as to produce a metallic paste, and the paste is printed on the green sheet by using a screen printing method. This is then subjected to drying, laminating, firmly pressing, and heating to remove the organic component, and is then sintered at about 1300° C. or more. Then, external electrodes are burnt to both ends of the ceramic dielectric layers, and a multilayer ceramic capacitor is thereby manufactured.

In manufacturing process for multilayer ceramic capacitors such as the above, the metallic paste is printed on the dielectric green sheet, and after laminating and firmly pressing, the organic component is vaporized and removed by heating. This heating is usually carried out at 250 to 400 ° C. in the air. Thus, the heating is carried out in an oxidizing atmosphere, and therefore the metallic powder is oxidized, whereby expansion of volume thereof is generated. Furthermore, the powder is further sintered by heating at a higher temperature after the heating to remove the organic component. This sintering is carried out in a reducing atmosphere, such as hydrogen gas atmosphere. Whereby the metallic powder once oxidized is reduced, and contraction of the volume is generated.

Thus, in the manufacturing process for multilayer ceramic capacitors, the volume changes of the metallic powder due to expansion and contraction thereof are generated by the oxidation-reduction reaction. Similarly, the volume of the dielectric body also changes due to the sintering. However the different materials of the dielectric body and the metallic powder are simultaneously sintered, and therefore sintering properties differ from each other due to changes in the volumes by expansion and contraction of these materials during sintering. For this reason, the strain is generated in the metallic paste layer. As a result, the process has problems in that the laminate construction may be broken and crack or peeling called delamination may occurs Specifically, sintering in a dielectric body comprising barium titanate as a main component initiates at 1000° C. or more, typically at a temperature in the range of 1200 to 1300° C. However, sintering in a metallic powder for internal electrodes initiates at lower temperature than that temperature, for example, normally at a temperature in the range of 400 to 500° C. in the case of metallic nickel powder, and as a result, the volume changes due to extreme contraction, and the portion between the internal electrode and the dielectric sheet is strained. Thus, the difference between the initiation temperatures for sintering results in difference between sintering properties of the internal electrode and the dielectric body, and this is therefore a primary cause of delamination. Moreover, when sintering is suddenly initiated at low temperatures, volume change in the final period of the sintering is large, so that delamination readily occurs. Therefore, in metallic powders used for internal electrodes, it is desirable that the initiation temperature for sintering be as high as possible and that extreme sintering does not occur.

Various methods for solving the problems of delamination have been proposed. For example, Japanese Unexamined Patent Application Publication No. 246001/96 discloses a metallic nickel powder in which the tap density to specific particle size is higher than the limiting value. In this publication, it has been described that if such metallic nickel powder is used, delamination is not easily occurred when a capacitor is produced by sintering the nickel powder and dielectric body dispersed in a paste.

The above conventional methods can yield some improvement in improving sintering properties. However, these methods are not sufficient to effectively prevent delamination. On the other hand, internal electrodes are required to be formed in thin layers and to have low in electrical resistance in accordance with the trends toward miniaturization and large capacity in capacitors, and therefore metallic powders for internal electrodes are required to be super-fine powders, having not only particle sizes of 1 μm or less, but also particle sizes of 0.5 μm or less. When such a powder consisting of super-fine particles is mixed with an organic solvent, the dispersion characteristics of the powder is deteriorated and the metallic particles agglomerate with each other. As a result, thin layers in internal electrodes cannot be easily formed due to an increase in the number of coarse particles, and bumps and depressions formed on a surface of electrodes may cause short circuiting and also may result in delamination. Therefore, further improvements in dispersion characteristics of metallic powders in organic solvents to form conductive pastes are desired.

Furthermore, as mentioned above, multilayer ceramic capacitors with internal electrodes made from base metallic powders, typified by nickel, are researched according to the requirements for inexpensive electrical parts. However, further development of metallic powders which can prevent occurrence of delamination in this state and are suitable for conductive pastes, has been required.

DISCLOSURE OF INVENTION

Therefore, an object of the present invention is to provide a metallic nickel powder in which superior sintering properties are exhibited during production processes for multilayer ceramic capacitors, and superior dispersion characteristics are exhibited in forming conductive pastes, thereby preventing occurrence of delamination. More specifically, the present invention provides a metallic nickel powder suitable for conductive pastes, in which the volume changes and the weight changes due to the oxidation-reduction reaction during sintering are small, the initiation temperature for sintering is high compared to that of conventional metallic nickel powders, and is near the sintering initiation temperature of dielectric bodies used in producing multilayer ceramic capacitors, whereby occurrence of delamination can be prevented and dispersion characteristics in solvent are superior.

The inventors have performed intensive research with regard to dispersion characteristics of a metallic nickel powder. As a result, they have reached a reasoning in which the powder clumps by the polarity of a OH group in nickel hydroxide (for example, $Ni(OH)_2$) which is included in the oxide film of the metallic nickel powder, whereby the dispersion characteristics are deteriorated. Therefore, a metallic nickel powder of the present invention was made as a result of various experiments based on the above reasoning, and it is characterized in that the oxygen content is 0.1 to 2.0% by weight and in that there is no absorption peak at wavelengths ranging from 3600 to 3700 $cm^{-1}$ in the infrared spectrum.

In the case in which metallic nickel powder containing oxygen is subjected to infrared spectroscopic analysis, there is a strong peak at about the 3644 $cm^{-1}$ wavelength. This peak is due to an OH group forming a chemical bond with metallic nickel. In the present invention, metallic nickel powder exhibiting no such peak is used, whereby as many OH groups as possible are removed so that clumping of powder particles due to the polarity thereof is suppressed.

The above peak is not due to water, alcohol, etc., physically adsorbed on the surface of the metallic nickel, and is instead due to nickel hydroxide. A metallic nickel powder of the present invention does not exhibit a strong peak at a wavelength of about 3644 $cm^{-1}$ in the infrared spectrum as described above. The "peak" does not include, for example, small noise peaks, etc., and instead refers to a peak of which the strength or area thereof can be measured when a base line is drawn. A metallic nickel powder of the present invention includes oxygen, and in view of possible application to multilayer ceramic capacitors, the oxygen content is preferably 0.1 to 2.0% by weight, is more preferably 0.3 to 1.0% by weight, and is most preferably 0.3 to 0.8% by weight.

Particle properties of the metallic nickel powder of the present invention are not particularly limited if nothing interferes with use in conductive pastes. However, since miniaturization of multilayer ceramic capacitors is required to reduce the weight of and compactly design recent electronic devices of which they are parts of, it is also required that particle size in metallic powders used for internal electrodes be smaller than ever. Therefore, average particle size of the metallic nickel powder according to the present invention is preferably 0.05 to 1 $\mu$m, and a fine particle ranging from 0.1 to 0.5 $\mu$m is even more preferable. The specific surface area of the metallic nickel powder by BET is preferably 1 to 20 $m^2/g$. In addition, the particle shape of the metallic nickel powder is preferably sphere in order to improve sintering properties and dispersion characteristics.

In the metallic nickel powder of the present invention, the metallic nickel content measured by an X-ray photoelectron spectroscopy is preferably 0 to 10 atomic percent. The metallic nickel content of 0 atomic percent indicates that the X-rays were blocked by an oxide film and did not reach the metallic nickel, and in this case, the oxidation of the metallic nickel powder is most suppressed. The metallic nickel content is preferably 0 to 8 atomic percent, and is more preferably 0 to 5 atomic percent.

The X-ray photoelectron spectroscopy (hereinafter referred to as XPS) measures the photoelectron spectrum using emission of photoelectrons generated from the inner-shell electron level according to the wavelength of the excited X-ray. This method is primary applied to the analysis of solid samples, and is widely applied to identify elements and for quantitative analysis of elements which are included at a depth from which a photoelectron can escape, that is, from a very thin layer on the surface of a solid, from which an electron can be emitted from the solid without encountering inelastic scattering.

In a case in which the metallic nickel having the oxide film is typically analyzed by using the XPS, the content of the nickel component, metallic nickel, nickel oxide, and atomic nickel due to nickel hydroxide, can be respectively identified, and quantitative analysis thereof can be carried out by comparison with a standard sample. Since the oxide film covers the surface of the metallic nickel powder, of the nickel components identified and quantitatively analyzed by the XPS, the metallic nickel is the metallic nickel under this oxide film. That is, the thinner the oxide film, the greater the ratio of the metallic nickel, and the thicker the oxide film, the smaller the ratio of the metallic nickel. Moreover, since a relationship exists between the accuracy of the oxide film and the ratio of the metallic nickel, even if the metallic nickel powder has oxide films of equal thickness, the lower the accuracy, the greater the ratio of the metallic nickel, and the higher the accuracy, the smaller the ratio of the metallic nickel.

In the above metallic nickel powder, metallic nickel on the surface is at a relatively low concentration of 0 to 10 atomic percent. In other words, the oxide film formed on the surface of metallic nickel powder of the present invention is a uniform oxide film having a definite thickness. Thus, when carrying out heating, in particular, when heating to remove organic components in the temperature range of 300 to 400° C. in production processes for multilayer ceramic capacitors, the change in volume and weight due to the oxdation-reduction reaction of nickel can be suppressed somewhat by forming the relatively strong oxide film.

Since the above metallic nickel powder has the strong oxide film on the surface thereof, the initiation temperature for sintering thereof is higher than for conventional metallic nickel powders, and it is nearer to the sintering initiation temperatures for dielectrics used for multilayer ceramic capacitors. Therefore, in the metallic nickel powder of the present invention, oxidation properties and sintering properties in heating are even more superior than in the conventional metallic nickel powder, whereby the dispersion characteristics thereof can be effectively improved.

Furthermore, the thickness of the above oxide film is preferably 2 nm or more, is more preferably 2.5 nm or more, and is most preferably in the range of 2.5 to 5 nm.

The above metallic nickel powder may be produced by well-known methods such as chemical vapor phase methods, liquid-phase methods, plasma methods, etc. In particular, vapor phase reduction methods in which the metallic nickel powder is formed by bringing into contact metallic nickel chloride gas, with a reducing gas, are preferable methods because the particle size of the metallic nickel powder to be formed can be easily controlled, and moreover, spherical particles can be efficiently produced. A vapor phase reduction method is a production technique in which metallic nickel chloride gas is made to react with a reducing gas such as hydrogen, and it can form the metallic nickel chloride gas by heating and vaporizing solid nickel chloride, in a manner similar to conventional methods. However, in view of antioxidation and energy efficiency for the nickel chloride, a production method in which metallic nickel chloride gas is continuously generated by being brought into contact with chlorine gas and metallic nickel, this metallic nickel chloride gas being directly supplied in the reduction process, and nickel chloride being continuously reduced by being brought into contact with a reducing gas, is advantageous.

In production processes for metallic nickel powders using vapor phase reduction reactions, atomic nickel is formed at the instant when the metallic nickel chloride gas comes in contact with the reducing gas, and ultrafine particles form and grow by collision and bonding of the metallic nickel atoms with each other. Particle size in the formed metallic nickel powder is determined by conditions in the reduction process, such as partial pressure and temperature of the metallic nickel chloride gas. According to the above production technique for metallic nickel powder, the metallic nickel chloride gas is generated in an amount corresponding to the supplied amount of chlorine gas, whereby the amount of metallic nickel chloride gas supplied in the reduction process can be controlled by changing the amount of chlorine gas supplied. Furthermore, the present invention differs from methods in which the metallic nickel chloride gas is generated by heating and vaporizing solid nickel chloride, and the metallic nickel chloride gas is generated by a reaction between the chlorine gas and the metallic nickel. The amount of carrier gas used can thereby be decreased, and moreover, depending on the production conditions, may not be necessary. Therefore, it may be possible to reduce costs by decreasing the amount of carrier gas used and decreasing the heating energy therefor.

The partial pressure of the metallic nickel chloride gas can be controlled in the reduction process by mixing inert gas with the metallic nickel chloride gas generated in the chlorination process. Thus, the particle size of the metallic nickel powder can be controlled by controlling the amount of chlorine gas supplied or the partial pressure of the metallic nickel chloride gas supplied in the reduction process; therefore, the particle size of the metallic nickel powder can be made uniform and be optionally set.

The above-described production conditions for the metallic nickel powder by the vapor phase reduction method cannot be absolutely specified; however, the metallic nickel as a starting material is preferably in granules, pellets, or plates having particle sizes of about 5 to 20 mm, and the purity thereof is preferably 99.5% or more. When a production technique is adopted in which the metallic nickel chloride gas is formed by reacting this metallic nickel with chlorine gas, it is necessary that the reaction temperature be 800° C. or more, but be less than the melting point of nickel of 1453° C., in order to sufficiently drive the reaction. In practice, the reaction temperature is preferably in the range of 900 to 1100° C. in view of the reaction rate and durability of the chlorination reactor. Here, the formed metallic nickel chloride gas is subjected to catalytic reaction with a reducing gas, such as hydrogen gas, etc., by direct supply in the reduction process. At this time, an inert gas, such as nitrogen, argon, etc., is mixed with the metallic nickel chloride gas at 1 to 30 mol percent, and this mixed gas may then be introduced into the reduction process. The temperature of the reduction reaction may be above a temperature at which the reaction will sufficiently progresses toward completion; however, the temperature is preferably less than the melting point of nickel since handling is easier if solid metallic nickel powder is formed, and it is in practice in the range of 900 to 1100° C. in view of economic efficiency.

Thus, the metallic nickel powder is formed by carrying out a reduction reaction, and the formed metallic nickel powder is then cooled. During cooling, it is desirable that gas flowing at 1000° C. near the completion of the reduction reaction is rapidly cooled to about 400 to 800° C. by blowing inert gas such as air, nitrogen gas, etc. A metallic nickel powder having desired particle size can thereby be obtained by preventing the generation of secondary particles in which primary particles of the formed nickel agglomerate with each other. Thereafter, the formed metallic nickel powder is separated and recovered by, for example, one or a combination two or more of means including a bag-filter, separation by collecting in water or oil, and magnetic separation.

It is preferable that metallic nickel powder produced in the above manner is subjected to heating in an oxidizing atmosphere. The type of atmosphere for the heating is not limited, so long as it is an oxidizing atmosphere. For example, the heating may be carried out in the air, and it may also be carried out in an oxygen gas atmosphere diluted with argon gas.

The heating in the oxidizing atmosphere is preferably carried out in a temperature range of 200 to 400° C., and in particular, in a temperature range of 230 to 300° C. When the heating is carried out at temperature exceeding the upper limit of this temperature range, a problem occurs in that the metallic nickel powders agglomerate with each other during sintering. When the heating temperature is lower than the lower limit of the above temperature range, the heating time must be considerably prolonged and is therefore not practical. It is desirable that the time taken for the heating be selected to be in the range of 1 minute to 10 hours, and in particular, 5 minutes to 1 hour. When the upper limit of this time range is exceeded, the metallic nickel powders agglomerate with each other during sintering, whereby particle growth occurs. In contrast, when the heating time is less than the above lower limit, the heating cannot be sufficiently conducted.

A metallic nickel powder obtained by the vapor phase reduction method may be subjected to the above heating immediately. For this reason, if nickel powder is left to stand in the air immediately being produced after, nickel hydroxide is formed by absorbing water, whereby the above heating time is necessary to remove this nickel hydroxide.

According to the metallic nickel powder of the present invention, by carrying out heating of a metallic nickel powder, produced by the above method, in an oxidizing atmosphere, a strong peak due to nickel hydroxide is not detectable by infrared spectroscopy. The initiation temperature for sintering of the metallic nickel powder when heating is carried out tends to be shifted to the higher temperature side, compared with the case in which the same heating is not carried out. As described above, this means that the occurrence of delamination is suppressed during the baking of the multilayer ceramic capacitor.

The metallic nickel powder of the present invention produced in the above manner exhibits superior sintering properties in production processes for multilayer ceramic capacitors, and provides effects in which the occurrence of delamination is suppressed. Specifically, according to the present invention, the initiation temperature for sintering is higher than in the conventional metallic powder and is approximately at the initiation temperature for sintering of a dielectric used in producing multilayer ceramic capacitors, and in addition, it exhibits superior dispersion characteristics in solvent, whereby a metallic nickel powder in which occurrence of delamination is suppressed is obtained.

BEST MODE FOR CARRYING OUT THE INVENTION

A preferred embodiment for producing a metallic nickel powder of the present invention will be explained hereinafter with reference to the accompanying drawings, further clarifying the effects of the present invention.

PRODUCTION OF METALLIC NICKEL POWDER

EXAMPLE 1

Figure 1:
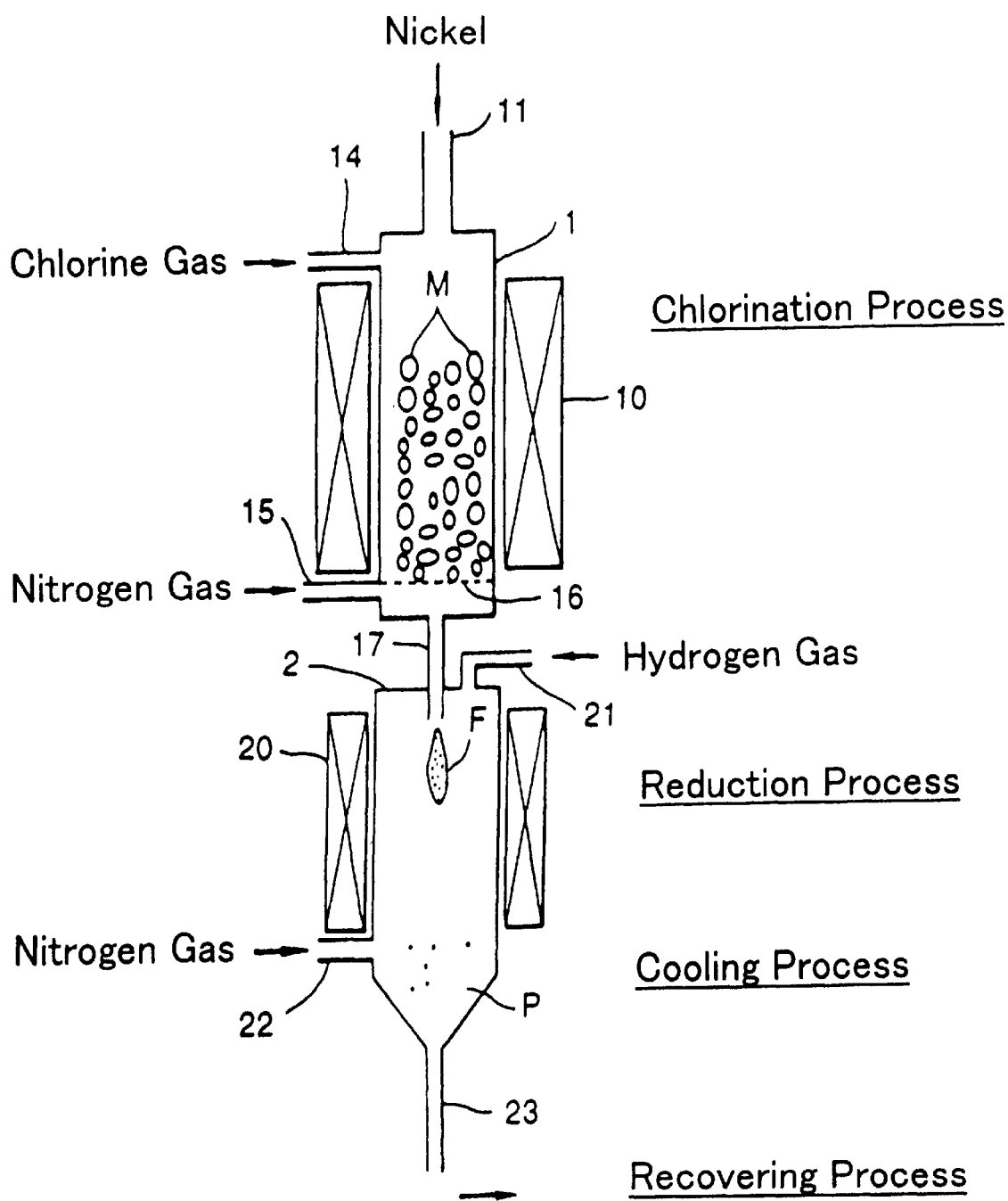
FIG. 1 is a vertical cross sectional view showing the construction of a production apparatus for a metallic nickel powder according to the present invention.

15 kg of metallic nickel powder having an average granule size of 5 mm as a starting material was filled in chlorination reactor 1 of the production apparatus for metallic nickel powder shown in FIG. 1. The temperature in the reactor 1 was raised to 1100° C. Chlorine gas was introduced into the reactor 1 at a flow rate of 4 Nl/min. Consequently, metallic nickel chloride gas was obtained by chlorination of the metallic nickel. Nitrogen gas at a molar ratio of 10% to the supplied amount of chlorine gas was mixed in the metallic nickel chloride gas, and the nickel chloride-nitrogen gas mixture was introduced from nozzle 17 at a flow rate of 2.3 m/sec (1000° C. conversion) into reduction reactor 2 in which the temperature in the reactor was heated to 1000° C. Simultaneously, hydrogen gas was supplied from the top of the reduction reactor 2 at a flow rate of 7 Nl/min, and the metallic nickel chloride gas was reduced. Nitrogen gas was supplied into the product gas including metallic nickel powder, which was created in this reduction reaction, at a flow rate of 24.5 Nl/min, as a cooling process, and the product gas was cooled to 400° C. from 1000° C. at a cooling rate of 100° C./sec. Then, mixed gas consisting of nitrogen gas, hydrochloric acid vapor, and metallic nickel powder was guided into an oil scrubber, whereby metallic nickel powder was separately recovered. The recovered metallic nickel powder was washed with xylene and was dried. Subsequently, the metallic nickel powder was subjected to heating at 250° C. for 30 minutes in the air, and the metallic nickel powder of Example 1 was obtained.

COMPARATIVE EXAMPLE 1

Metallic nickel powder of Comparative Example 1 was obtained in a similar manner as in Example 1, except that the heating at 250° C. for 30 minutes was not carried out.

MEASUREMENTS

Figure 2:
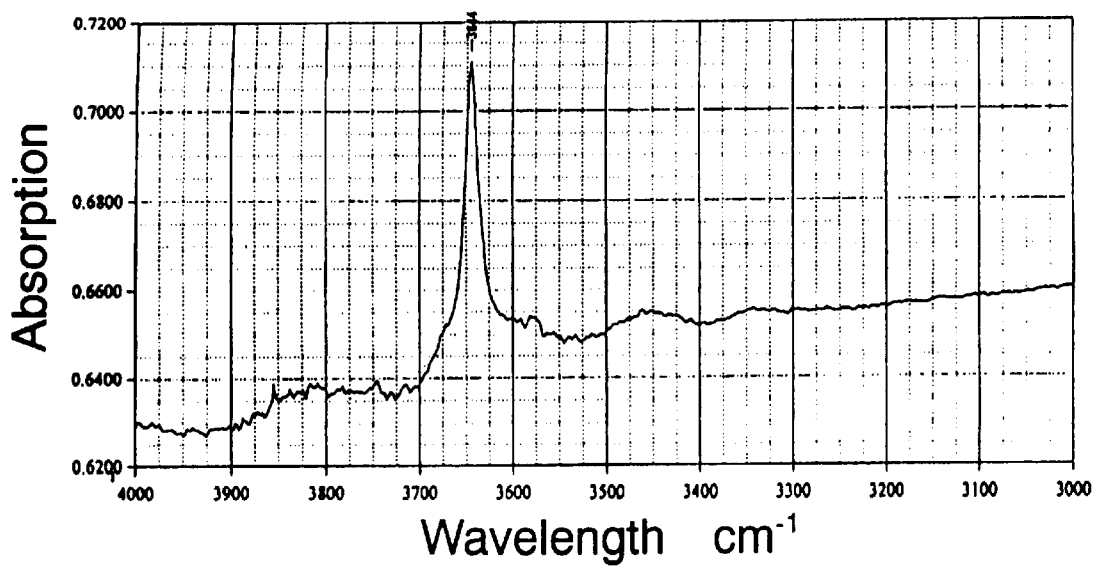
FIGS. 2(a) and 2(b) are graphs showing results of infrared spectroscopic analysis, for comparison of embodiments according to the present invention, for Comparative Example 1 and Example 1, respectively.
Figure 2:
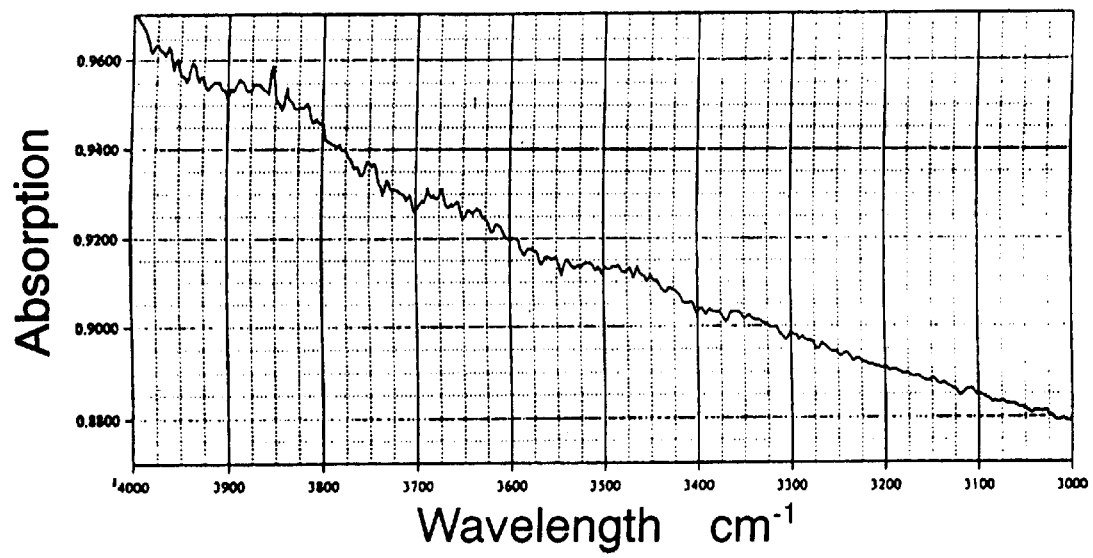

With regard to the metallic nickel powders according to the above Example and the Comparative Example, the thickness of the oxide film, the oxygen content, the metallic nickel content by XPS, the average particle size, the initiation temperature for sintering, the oxidation properties, the particle size distribution, and the infrared spectroscopic analysis were measured by the following methods, and these results are shown in Table 1. In FIG. 2, (a) shows a measurement result of the Comparative Example 1, and (b) shows a measurement result of the Example 1.

1) Thickness of Oxide Film

The metallic nickel powder sample was directly sprinkled on a copper mesh sheet on which a collodion film was adhered, and then carbon was vapor-deposited thereon, whereby a sample for measurement was obtained. Then, using a 200 kV field-emission type transmission electron microscope (trade name: HF-2000, produced by Hitachi, Ltd.), a lattice image of the sample for measurement was observed, and the thickness of the oxide film on the surface of the metallic nickel powder was measured.

2) Oxygen Content

The metallic nickel powder sample was filled in a nickel capsule, and the capsule was placed in a graphite crucible and was heated to about 3000° C. in an argon atmosphere. At this time, the amount of carbon monoxide produced was quantitatively measured by IR, and the oxygen content in the metallic nickel powder was determined.

3) Metallic Nickel Content (X-ray photoelectron spectroscopy)

An X-ray photoelectron spectrometer (trade name: XPS5600CI, produced by ULVAC PHI Co.) was employed at an output power of 300 W using monochromatic Alkα as an X-ray source. The metallic nickel powder sample was filled in an aluminum container 5 mm in diameter and 2 mm in length in an appropriate amount, and was press-formed at 100 kg/cm$^2$, whereby a sample for measurement was prepared. Binding energy was measured at a detection angle of 65° within a range of 0 to 1200 eV, using a spectrum based on the $Ni_2P$ electron as a standard. Subsequently, peaks between 850 to 857 eV were deducted as the background by the Shirley method, the deducted peaks were integrated, and the strengths thereof were defined as the strengths due to the metallic nickel. With respect to the oxygen atoms, the strengths of peaks between 527 to 535 eV were determined in a similar manner. Consequently, a sensitivity coefficient was obtained by the strengths of metallic nickel and atomic oxygen, whereby the metallic nickel content was obtained.

4) Average Particle Size

The metallic nickel powder sample was photographed using an electron microscope, the sizes of 200 particles of the metallic nickel powder were measured from the photograph, and the average thereof was calculated.

5) Initiation Temperature for Sintering 1 g of the metallic nickel powder, 3% by weight of camphor, and 3% by weight of acetone were mixed, and the mixture was filled in a metallic die 5 mm in diameter and 10 mm long. Then, the mixture had applied thereto a bearing load of 3 tons, whereby a test piece was prepared. The initiation temperature for sintering of this test piece was measured, using a thermal expansion and contraction properties (diratometry), with a measuring device (trade name: TD-5000 S, produced by Mac Science Co.), at a heating rate of 5° C./min, in a nitrogen atmosphere.

6) Oxidation Properties

The metallic nickel powder sample was heated to 1100° C. at a heating rate of 50° C./hour in the air, and the rate of weight increase (%) at 400° C. and temperature at which there was a 1% by weight increase were determined by the TG-DTA measuring device.

7) Particle Size Distribution in Dispersing Solvent

The metallic nickel powder was suspended in a solution consisting of 10% of isopropanol and 90% of ethanol and was dispersed using a homogenizer for 3 minutes. The particle size of the metallic nickel powder was measured, using a particle size measuring device according to a laser beam scattering diffraction method (trade name: LS 230, produced by Coalter Co.), and the particle size distribution of the volume values was obtained. In the particle size distribution as shown in Table 1, D10, D50, and D90 show particle sizes of 10%, 50%, and 90% as estimated particle sizes, respectively.

8) Infrared Spectroscopic Analysis

A suitable amount of the metallic nickel powder sample was filled in a sample holder for diffuse reflection, and infrared spectroscopic analysis by a diffuse reflectance method was carried out on the sample in the range of 400 to 4000 $cm^{-1}$ at a resolution of 4 $cm^{-1}$ in the air, using an infrared spectrometer (trade name: JIR-100 type, produced by JEOL Ltd.).

TABLE 1

| Measurements | Example | Comparative Example |
|---|---|---|
| Thickness of Oxide Film (nm) | 3.0 | 1.0 |
| Oxygen Content (wt %) | 0.63 | 0.50 |
| Metallic Nickel Content (atomic percent) | 3.6 | 16.3 |
| Average Particle Size (μm) | 0.49 | 0.48 |
| Initiation Temperature for Sintering (° C.) | 585 | 380 |
| Oxidation Properties | | |
| Weight Increase at 400° C. (%) | 5.3 | 5.9 |
| Temperature of 1 wt % Increase (° C.) | 343 | 278 |
| Particle Size Distribution | | |
| D10 (μm) | 0.98 | 0.93 |
| D50 (μm) | 1.55 | 1.58 |
| D90 (μm) | 2.24 | 2.63 |

As can be seen from FIG. 2, in infrared spectroscopy of the Comparative Example shown in (a), a strong absorption peak due to an OH group was detected at a wavelength of 3644 $cm^{-1}$. In contrast, in infrared spectroscopy of the Example, as shown in (b), such a peak was not detected.

As can be seen from Table 1, there is rarely a difference between average particle size in the metallic nickel powder of the Example and that of the Comparative Example; however, in the particle size distribution when the particles were dispersed in a solvent, the distribution of the metallic nickel powder of the Example was narrower than that of the Comparative Example. In the metallic nickel powder of the Example, the initiation temperature for sintering was higher than that of the Comparative Example. In addition, in the metallic nickel powder of the Example, the weight increase at 400° C. was smaller than that in the Comparative Example, and the temperature at which there was an increase of 1% by weight was higher than that of the Comparative Example. From this fact, it is shown that the metallic nickel powder of the Example has suppressed oxidation in comparison with the Comparative Example.

From the above result, the metallic nickel powder of the present invention exhibits superior sintering properties in production processes for multilayer ceramic capacitors and superior dispersion characteristics when conductive pastes are formed, and in addition, volume changes thereof are small due to suppressed oxidation. Delamination can thereby be prevented from occurring.

As explained above, according to the present invention, the dispersion characteristics in forming conductive pastes is superior, and the sintering properties are better than those of conventional metallic nickel powders due to the higher initiation temperature for sintering, and in addition, volume changes are small since oxidation is suppressed by the existence of the oxide film. Therefore, the present invention can provide an effect in which the occurrence of the delamination in the production processes for multilayer ceramic capacitors is prevented.

What is claimed is:

1. A metallic nickel powder, comprising nickel particles coated with an oxide film, wherein said metallic nickel powder has:

an oxygen content ranging from 0.1 to 2.0% by weight;

an absence of an absorption peak at wavelengths ranging from 3600 to 3700 $cm^{-1}$ in infrared spectroscopy; and an average particle size ranging from 0.05 to 1 μm.

2. A metallic nickel powder as recited in claim 1, wherein said metallic nickel powder is produced by using a vapor phase chemical method and by heating in an oxidizing atmosphere.

3. A metallic nickel powder as recited in claim 2, wherein said heating is carried out in the range of 200 to 400° C.

4. A metallic nickel powder as recited in claim 1, wherein the metallic nickel content obtained is 0 to 10 atomic percent when a surface thereof is measured by X-ray photoelectron spectroscopy.

5. A metallic nickel powder as recited in claim 1, wherein the thickness of an oxide film is 2 nm or more.

6. A metallic nickel powder as recited in claim 1, wherein said metallic nickel powder is produced by reducing nickel chloride gas with a reducing gas.

7. A metallic nickel powder is used as recited in claim 1, wherein said metallic nickel powder is used in conductive pastes.

8. A metallic nickel powder as recited in claim 1, wherein said metallic nickel powder is used multilayer ceramic capacitors.

9. A metallic nickel powder as recited in claim 1, wherein the specific surface area by BET is 1 to 20 $m^2/g$.

10. A metallic nickel powder as recited in one claim 1, wherein the particles are spheres.

* * * * *

UNITED STATES PATENT AND TRADEMARK OFFICE
CERTIFICATE OF CORRECTION

PATENT NO. : 6,391,084 B1
DATED : May 21, 2002
INVENTOR(S) : Ito et al.

It is certified that error appears in the above-identified patent and that said Letters Patent is hereby corrected as shown below:

<u>Title page,</u>
Item [22], PCT Filed, change "Jul. 21, 1998" to -- Jul. 21, 1999 --.

Signed and Sealed this

Twenty-fourth Day of December, 2002

JAMES E. ROGAN
*Director of the United States Patent and Trademark Office*